US011104082B2

United States Patent
Jones et al.

(10) Patent No.: US 11,104,082 B2
(45) Date of Patent: Aug. 31, 2021

(54) MAGNETIC ASSISTED PLASTIC COMPOSITE WELDING FOR WELD LINE FIBER CROSSOVER

(71) Applicant: GM GLOBAL TECHNOLOGY OPERATIONS LLC, Detroit, MI (US)

(72) Inventors: Marie-Christine Jones, Bingham Farms, MI (US); Nikki Sgriccia, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 16/533,104

(22) Filed: Aug. 6, 2019

(65) Prior Publication Data

US 2021/0039331 A1   Feb. 11, 2021

(51) Int. Cl.
| | | |
|---|---|---|
| *B29C 65/02* | (2006.01) | |
| *B29C 65/00* | (2006.01) | |
| *B23K 20/10* | (2006.01) | |
| *B23K 31/00* | (2006.01) | |
| *B29C 65/08* | (2006.01) | |
| *B29C 65/14* | (2006.01) | |
| *B29K 307/04* | (2006.01) | |

(Continued)

(52) U.S. Cl.
CPC ............ *B29C 66/03* (2013.01); *B23K 20/106* (2013.01); *B23K 31/003* (2013.01); *B29C 65/08* (2013.01); *B29C 65/1412* (2013.01); *B29C 66/7212* (2013.01); *B23K 2103/42* (2018.08); *B29K 2307/04* (2013.01); *B29K 2309/08* (2013.01)

(58) Field of Classification Search
CPC ..... B29C 66/03; B29C 65/08; B29C 66/7212; B29C 65/1412; B23K 20/106; B23K 31/003; B23K 2103/42; B29K 2307/04; B29K 2309/08
See application file for complete search history.

(56) References Cited

U.S. PATENT DOCUMENTS

| | | | |
|---|---|---|---|
| 6,284,089 B1 * | 9/2001 | Anderson ........... | B29C 65/5042 156/304.3 |
| 9,731,456 B2 | 8/2017 | Kushalappa et al. | |

(Continued)

FOREIGN PATENT DOCUMENTS

JP     3-159713 A  *  7/1991

OTHER PUBLICATIONS

Machine Translation of Japanese Patent 3-159713, Date Unknown.*

*Primary Examiner* — Jeffry H Aftergut
(74) *Attorney, Agent, or Firm* — Quinn IP Law

(57) ABSTRACT

A welding method includes: moving a welding head toward a plurality of workpieces, wherein each of the plurality of workpieces includes a polymeric composite, the polymeric composite includes a polymer matrix and a plurality of fibers, and each of the fibers includes a magnetic material; applying a joining pressure to the workpieces with the welding head; applying energy to the plurality of workpieces to melt an interface between the plurality of workpieces, wherein a weld plane is defined at the interface between the plurality of workpieces; and applying a magnetic field to the plurality of workpieces to change an orientation of the plurality of fibers relative to the polymer matrix in the weld area so that the fibers in a weld area are at an angle relative to the weld plane.

15 Claims, 1 Drawing Sheet

(51) Int. Cl.
  *B23K 103/00* (2006.01)
  *B29K 309/08* (2006.01)

(56) References Cited

U.S. PATENT DOCUMENTS

2013/0157053 A1  6/2013  Heikkila et al.
2018/0063895 A1  3/2018  Van Tooren et al.

* cited by examiner

MAGNETIC ASSISTED PLASTIC COMPOSITE WELDING FOR WELD LINE FIBER CROSSOVER

INTRODUCTION

The present disclosure relates to magnetic assisted plastic composite welding for weld line fiber crossover.

Plastic welding is a process for joining two or more workpieces. In general, welding may include the application of heat and pressure to at least two workpieces in order to coalesce the workpieces. Numerous welding processes have been developed over the years.

SUMMARY

The present disclosure relates to magnetic assisted plastic composite welding for weld line fiber crossover. This method combines a magnetic field with the welding process of plastic composites to orient fibers across the weld and strengthen the weld. The weld is the structurally weakest area of a welded fiber reinforced plastic composite part. For example, intake manifolds may fail at the weld during a burst test. Welding of short fiber plastic composites induces fiber flowing (squeeze out) and a narrow (about 100 μm) weak weld layer with fibers oriented in the weld plane. The presently disclosed method entails using magnetic fibers such as nickel-coated glass or carbon fibers, and apply an external magnetic field during the welding process to exert some control of the fiber orientation. As a result, the magnetic fibers partially overcome the welding induced viscous material flow and orient towards the magnetic field direction selected perpendicular to the weld plane. The impact of the externally applied magnetic field on the control of fiber orientation and therefore macro-properties can be investigated numerous ways: CT scan (fiber orientation tensor), mechanical test (stronger/stiffer in Z direction), burst pressure of intake manifold (higher burst pressure), electrical conductivity in the case of electrically conductive fibers (higher in Z direction), etc. The Z direction may be referred to as the vertical direction or the magnetic field direction.

In the presently disclosed welding tool, magnets may be incorporated in the weld tool and cooled. Alternatively, the magnets may be external to the welding tool, and the welding tool may be made of magnetically permeable material (e.g., plastics, some steels). The use of a magnetic field (produced by the magnets) during the welding process is to preferentially orient magnetic fibers across the weld plane. The magnetic field may be adjusted to control the fiber orientation and the properties of the plastic composite independently of the material flow during welding. The resulting weld is stiffer and stronger than other welds as a result of magnetic fibers orienting across the weld plane achieved by the combined effect of magnetic and flow fields. The presently disclosed method uses magnetic field to greatly improve the weld, instead of just optimizing less influential parameters such as clamp force, pressure, hold time, etc. The magnets (e.g., NdFeB magnets) may be incorporated in the tooling system and cooled to avoid loss of magnetic field, or may be external with tools made of magnetically permeable material (e.g., plastics, some steels).

The plastic composite includes magnetic fibers of an aspect ratio that is greater than 1 to allow the magnetic-assisted welding process. The fibers may be nickel coated fibers. Stated differently, the fibers of the reinforced plastic composite are made highly magnetic by coating with a magnetic metal, such as nickel. The joining/welding equipment, whether for vibration or infrared or other welding technique, incorporates one or more magnets. The magnets may be disposed inside the tools that hold the two parts to be welded, or external to the tools. The magnets may be, for example, NdFeB permanent magnets. A cooling system may be used to avoid loss of magnetic field. The effect of magnetic strength and position of the magnets on the desired controlled fiber orientation of the weld must be evaluated.

In an aspect of the present disclosure, a welding method includes moving a welding head toward a plurality of workpieces. Each of the workpieces includes a polymeric composite. The polymeric composite includes a polymer matrix and a plurality of fibers. Each of the fibers includes a magnetic material. The method further includes applying a joining pressure to the workpieces with the welding head. Further, the method includes applying energy to the plurality of workpieces to melt an interface between the plurality of workpieces. A weld plane is defined at the interface between the plurality of workpieces. The method further includes applying a magnetic field to the workpieces to change the orientation of the plurality of fibers relative to the polymer matrix so that the fibers in a weld area are at an angle relative to the weld plane.

The welding head may be part of a welding tool. The welding tool may further include a support. The welding head is movable relative to the support to apply the joining pressure to the workpieces. The welding tool may further include at least one permanent magnet to apply the magnetic field to the workpieces.

The plurality of workpieces includes a first workpiece and a second workpiece. The magnetic field is applied to the first workpiece and the second workpiece so that the fibers in the weld area are at an angle relative to the weld plane. At least one permanent magnet may be disposed inside the welding head for protection. The welding method may further include cooling at least one permanent magnet (if disposed inside the welding tool) to minimize demagnetization of that magnet due to heat. At least one magnet may be disposed outside of the welding head to cool the magnet through natural convention. If one or more magnets are disposed outside the welding tool, the welding head may be made of a magnetically permeable material to allow the magnetic field to pass through the welding head. The magnetically permeable material may be a polymeric material. At least one magnet may be a Neodymium Iron Boron (NeFeB) magnet.

The fibers may have an aspect ratio greater than 1 to allow the magnetic field to change the orientation of the fibers. The fibers may include a coating made of a magnetic material. For instance, the fibers may be nickel-coated glass fibers. The energy applied to the workpieces may be infrared energy in order to weld the plurality of workpieces together. The energy applied to the workpieces may be ultrasonic acoustic vibrations to weld the plurality of workpieces together. The magnetic field is applied to the workpieces so that most of the fibers in are angled between twenty (20) degrees and one hundred sixty (160) degrees relative to the weld plane to maximize stiffness and strength of the weld area and/or the welded workpieces measured in a direction perpendicular to the weld plane.

The present disclosure also describes a product made by the welding method described above. This product may be the weld bead or a final product including the weld bead.

The above features and advantages, and other features and advantages, of the present teachings are readily apparent from the following detailed description of some of the best modes and other embodiments for carrying out the present

DETAILED DESCRIPTION

Figure 1:
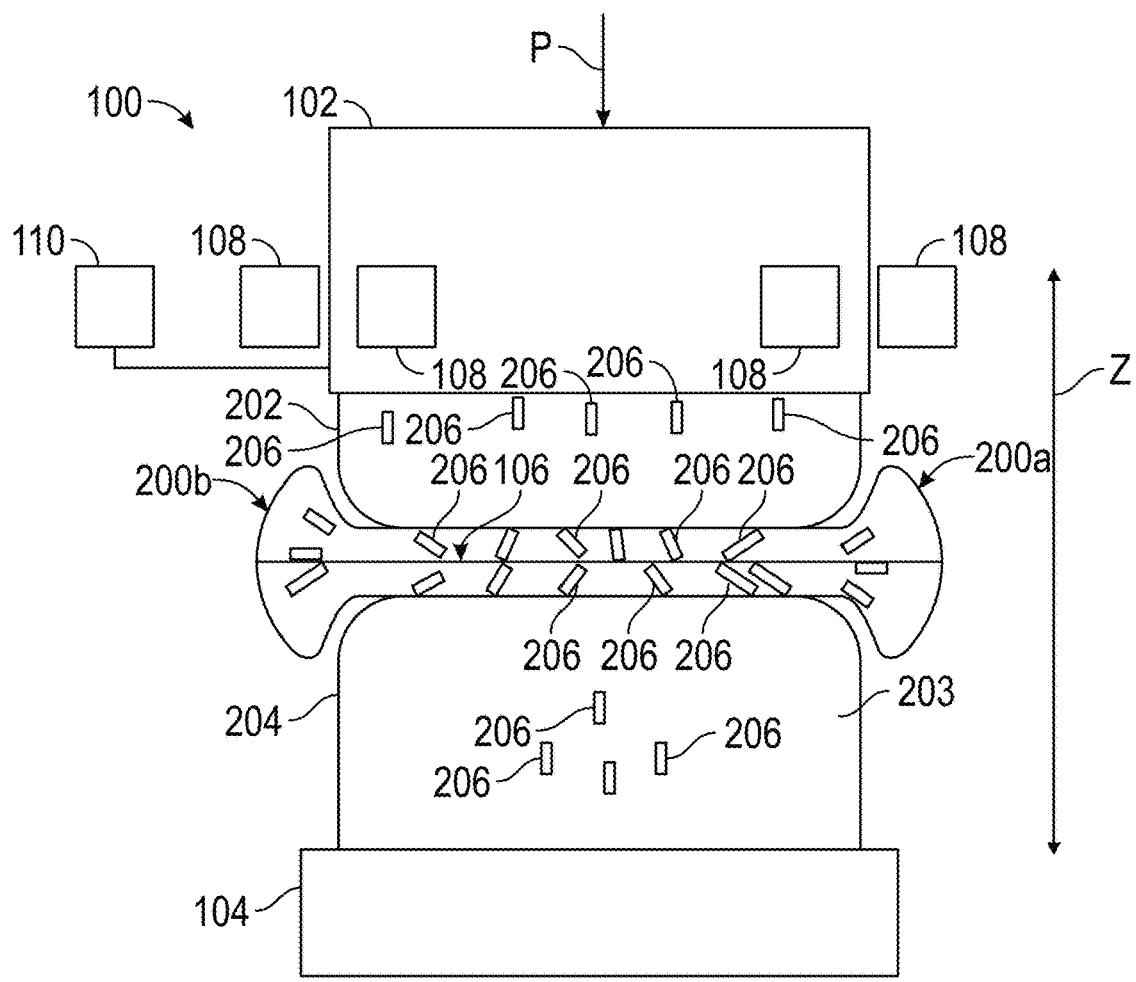
FIG. 1 is a schematic illustration of a weld tool that is welding two workpieces.

The following detailed description is merely exemplary in nature and is not intended to limit the application and uses. Furthermore, there is no intention to be bound by expressed or implied theory presented in the preceding introduction, summary or the following detailed description.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

With respect to claim 1, a welding tool 100 can weld one or more workpieces (e.g., the first workpiece 202 and the second workpiece 204) and includes a welding head 102 and a support 104. At least the welding head 102 is movable relative to the support 104 towards and away from the support in the direction indicated by double arrows Z to apply a joining pressure P to the first workpiece 202 and the second workpiece 204. The support 104 defines an interface surface in direct contact with at least one of the workpieces (e.g., the second workpiece 204). The melted film 200a at the interface of the workpieces (e.g., a first workpiece 202 and a second workpiece 204) becomes a weld bead 200b and defines a weld plane 106. The Z direction is perpendicular to the weld plane 106. The weld plane 106 is orthogonal to the direction Z (e.g., the vertical direction). The weld tool 100 includes one or more permanent magnets 108 for generating a magnetic field. The permanent magnets 108 may be made of a magnetic material, such as a Neodymium Iron Boron (NeFeB) alloy. Thus, the permanent magnets 108 may include NeFeB magnets to maximize the strength of the magnetic field applied to the workpieces (e.g., first workpiece 202 and second workpiece 204).

The permanent magnets 108 may be disposed inside the weld tool 100 and/or outside the weld tool 100. For instance, the permanent magnets 108 may be disposed entirely inside the welding head 102 and/or disposed entirely outside the welding head 102. If one or more permanent magnet 108 is disposed inside the weld tool 100 (e.g., the welding head 102), then the weld tool 100 may include a cooling system 110, such as a chiller, to cool the permanent magnets 108, thereby minimizing demagnetization of the permanent magnets 108 disposed inside the weld tool 100. If one or more of the permanent magnets 108 are disposed outside the weld tool 100 (e.g., outside the welding head 102) to allow cooling through natural convention, then one or more parts of the weld tool 100 (e.g., the welding head 102 and/or the support 104) is made of a magnetically permeable material magnetically permeable material to allow the magnetic field produced by the permanent magnets 108 to pass through the weld tool 100 (e.g., welding head 102 and/or support 104). Suitable magnetically permeable materials include polymeric materials and some steels.

One or more of the workpieces (e.g., the first workpiece 202 and the second workpiece 204) is a polymeric composite. The polymeric composite includes a polymer matrix 203 and a plurality of fibers 206. The aspect ratio of each fiber 206 is greater than one (1) to allow the magnetic field generated by the permanent magnets 108 to change the orientation of the fibers 206. In the present disclosure, the term "aspect ratio" means the ratio of the width to the length of each fiber 206. Thus, each of the fibers 206 has an elongated shape to allow the magnetic field generated by the permanent magnets 108 to change the orientation of the fibers 206. Each of the fibers 206 includes a magnetic material to allow the magnetic field applied by the permanent magnets 108 to change the orientation of the fibers 206. For example, the fibers 206 may be coated with a magnetic material, such as a metallic material. For instance, the fibers 206 may include nickel-coated glass fibers and/or nickel coated carbon fibers.

Figure 2:
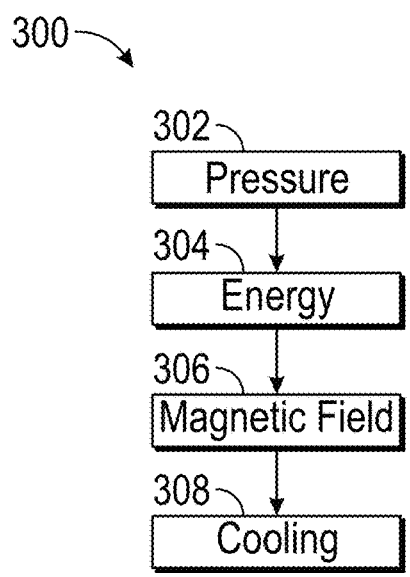
FIG. 2 is a flowchart of a welding method using the weld tool shown in FIG. 1.

FIG. 2 illustrates a welding method 300. The welding method 300 begins at block 302. Block 302 entails applying a joining pressure P to the workpieces (e.g., the first workpiece 202 and the second workpiece 204) with at least the welding head 102 by moving the welding head 102 toward the workpieces and the support 104. The first workpiece 202 and the second workpiece 204 may be two molded shells. Then, the welding method 300 proceeds to block 304. Block 304 entails applying energy to the workpieces (e.g., the first workpiece 202 and the second workpiece 204) to join (i.e., melt) the workpieces together at and around an interface between the workpieces. The interface between the workpieces is located at and around the weld plane 106. The weld bead 200b is the composite in the melted phase location created as a result of the applied energy. This weld bead is in solid state and is formed after the melted film 200a cools below a predetermined temperature. The energy to induce melting may be (but is not limited to) infrared energy (i.e., heat) and/or ultrasonic acoustic vibrations or another form of energy suitable to weld the workpieces (e.g., the first workpiece 202 and the second workpiece 204) together. The welding method 300 also includes block 306. Block 306 entails applying a magnetic field to the workpieces (e.g., the first workpiece 202 and the second workpiece 204) to orient the fibers 206 at an angle to the weld plane 106 during the welding process. The magnetic field is applied during the welding process to workpieces (e.g., the first workpiece 202 and the second workpiece 204) so that the orientation of all or most of the fibers 206 in the melted film 200a orient at an angle to the weld plane 106. In the present disclosure, the phrase "fibers are in a weld area at an angle relative to the weld plane" as mentioned with respect to the orientation to the fibers 206 relative to the weld plane 106 means that the fibers 206 are angled between twenty (20) degrees and one hundred sixty (160) degrees relative to the weld plane 106 to maximize the stiffness and the strength in the Z direction of the resulting product 200b (e.g., weld bead) and the final part. The term "weld area" means the area at the interface between the first workpiece 202 and the second workpiece 204 that melts during welding (i.e., the melted film 200a during welding and the weld bead after welding and cooling).

The steps of block 304 and 306 take place at the same time. In other words, the energy (e.g., infrared energy and/or ultrasonic acoustic vibrations) and the magnetic field are applied simultaneously to facilitate movement of the fibers 206 during welding. So once the joining pressure P is applied at block 302, both the energy applied at block 304 to melt the material and create the melted film 200a (i.e., the weld bead in the meld phase) from the workpieces and the magnetic field applied at block 306 are needed to orient the fibers in the melt film 200a at an angle to the weld plane 106. At the end of this process, the energy 304 is removed to allow the solidification of the weld bead (from 200a to 200b). The resulting product 200b (either the weld bead 200b or the final part) is stiffer/stronger in the Z direction than it would be without the magnetic field. In the depicted embodiment, the orientation of all or at least most of the fibers 206 at the melted phase location are obliquely angled relative to the weld plane 106 due to melt flow and the magnetic field. Because the fibers 206 are oriented substantially at an angle relative to the weld plane 106, the product 200b (e.g., weld bead) created by this welding method 300 is stiffer and stronger than products welded without using the welding method 300. In other words, as a result of orienting most or all of the fibers 206 in a way that is at an angle to the weld plane 106, the product 200b is stiffer and stronger in the Z direction than other welded products.

The method also includes block 308. Block 308 entails actively cooling one or more permanent magnet 108 (if disposed inside the welding tool 100) to minimize demagnetization of the permanent magnets 108 due to heat. The cooling system 110, such as a chiller, may be used to actively cool the permanent magnets 108. At the end of the welding method 300, the outcome is a final part (such as an air intake manifold) which contains the first workpiece 202 and the second workpiece 204 and the weld bead 200b that joins the first workpiece 202 and the second workpiece 204 together. The weld bead 200b is the weld bead that is a bit of material from both the first workpiece 202 and the second workpiece 204. It is created during the welding process, it is in the melt phase during the welding process (i.e., melted film 200a), and this is when the fibers can orient as a function of material flow, and as a function of the magnetic field. Then, at the end of the process, when the energy is no longer applied and the material gets to cool, it is a solid (i.e., weld bead 200b). In the present disclosure, the term "product" may refer to the weld bead 200b or the final product that includes the weld bead 200b. The portion of the first workpiece 202 and the second workpiece 204 that did not melt, plus this weld bead 200b, now form the final part such as the intake manifold. The fibers 206 in the weld bead 200b are affected by the process. The fibers 206 that are not in the weld bead 200b are unaffected by the process.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A welding method, comprising:
   moving a welding head toward a plurality of workpieces, wherein each of the plurality of workpieces includes a polymeric composite, the polymeric composite includes a polymer matrix and a plurality of fibers, each of the fibers includes a magnetic material, the welding head is part of a welding tool, and the welding tool further includes at least one permanent magnet to apply a magnetic field;
   applying a joining pressure to the workpieces with the welding head;
   applying energy to the plurality of workpieces to melt an interface between the plurality of workpieces, wherein a weld plane is defined at the interface between the plurality of workpieces;
   applying the magnetic field to the plurality of workpieces to change an orientation of the plurality of fibers relative to the polymer matrix so that the fibers in a weld area are at an angle relative to the weld plane; and
   cooling the at least one permanent magnet to minimize demagnetization.

2. The welding method of claim 1, wherein the welding tool further includes a support, and the welding head is movable relative to the support to apply the joining pressure to the workpieces.

3. The welding method of claim 2, wherein the plurality of workpieces includes a first workpiece and a second workpiece, and the magnetic field is applied to the first workpiece and the second workpiece so that the fibers in the weld area are at the angle relative to the weld plane.

4. The welding method of claim 2, wherein the at least one permanent magnet is disposed inside the welding head.

5. The welding method of claim 2, wherein the at least one permanent magnet is disposed outside of the welding head.

6. The welding method of claim 5, wherein the welding head includes a magnetically permeable material to allow the magnetic field to pass through the welding head.

7. The welding method of claim 6, wherein the magnetically permeable material is a polymeric material.

8. The welding method of claim 2, wherein the at least one permanent magnet is a Neodymium Iron Boron (NeFeB) magnet to maximize a strength of the magnetic field applied to the workpieces.

9. The welding method of claim 1, wherein each of the plurality of fibers has an aspect ratio greater than 1 to allow the magnetic field to change the orientation of the plurality of fibers.

10. The welding method of claim 1, wherein the plurality of fibers includes at least one of nickel-coated glass and carbon fibers.

11. The welding method of claim 1, wherein the plurality of fibers includes a coating made of a magnetic material.

12. The welding method of claim 1, wherein the welding head is part of a welding tool, the welding tool further includes a support, the welding head is movable relative to the support along a vertical direction in order to apply the joining pressure to the workpieces, the welding tool further includes at least one permanent magnet to apply the magnetic field, the plurality of workpieces includes a first workpiece and a second workpiece, the vertical direction is perpendicular to the weld plane, the magnetic field is applied to the first workpiece and the second workpiece so that most of the fibers in the weld area are at the angle relative to the weld plane, and the angle is between twenty degrees and one hundred sixty degrees to maximize stiffness and strength of the weld area measured in a direction perpendicular to the weld plane.

13. The welding method of claim 1, wherein the welding head is part of a welding tool, the welding tool further includes a support, the welding head is movable relative to the support to apply the joining pressure to the workpieces, the welding tool further includes at least one permanent magnet to apply the magnetic field, each of the fibers has an elongated shape to allow the magnetic field generated by the at least one permanent magnet to change the orientation of the fibers, the at least one permanent magnet is disposed inside the welding head for protection, the welding head is part of a welding tool, the welding head is movable relative to the support to apply the joining pressure to the workpieces, the welding method further comprises cooling, using a cooling system, the at least one permanent magnet to minimize demagnetization, the plurality of workpieces includes a first workpiece and a second workpiece, the magnetic field is applied to the workpieces to so that most of the plurality of fibers in the weld area are angled between forty-five degrees and one hundred thirty-five degrees relative to the weld plane to maximize stiffness and strength of the weld area measured in a direction perpendicular to the weld plane, the welding head includes a magnetically permeable material to allow the magnetic field to pass through the welding head, and applying the magnetic field and applying the energy occur simultaneously to facilitate movement of the plurality of fibers.

14. A welding method, comprising:
moving a welding head toward a plurality of workpieces, wherein each of the plurality of workpieces includes a polymeric composite, the polymeric composite includes a polymer matrix and a plurality of fibers, and each of the fibers includes a magnetic material;
applying a joining pressure to the workpieces with the welding head;
applying energy to the plurality of workpieces to melt an interface between the plurality of workpieces, wherein a weld plane is defined at the interface between the plurality of workpieces; and
applying a magnetic field to the plurality of workpieces to change an orientation of the plurality of fibers relative to the polymer matrix so that the fibers in a weld area are at an angle relative to the weld plane;
wherein the energy applied to the plurality of workpieces includes infrared energy in order to weld the plurality of workpieces together.

15. A welding method, comprising:
moving a welding head toward a plurality of workpieces, wherein each of the plurality of workpieces includes a polymeric composite, the polymeric composite includes a polymer matrix and a plurality of fibers, and each of the fibers includes a magnetic material;
applying a joining pressure to the workpieces with the welding head;
applying energy to the plurality of workpieces to melt an interface between the plurality of workpieces, wherein a weld plane is defined at the interface between the plurality of workpieces; and
applying a magnetic field to the plurality of workpieces to change an orientation of the plurality of fibers relative to the polymer matrix so that the fibers in a weld area are at an angle relative to the weld plane;
wherein the energy applied to the plurality of workpieces includes ultrasonic acoustic vibrations to weld the plurality of workpieces together.

\* \* \* \* \*